Nov. 14, 1933.                R. H. MASTERS                1,934,987
                                GAS SAVER
                         Original Filed May 16, 1931
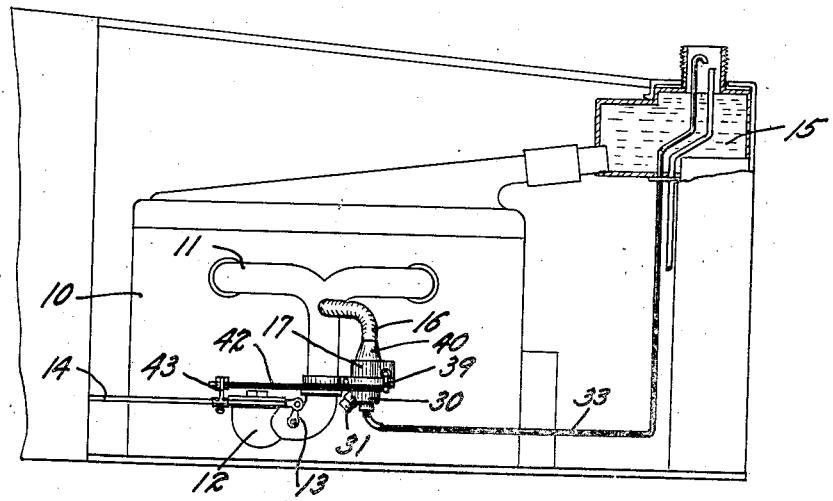
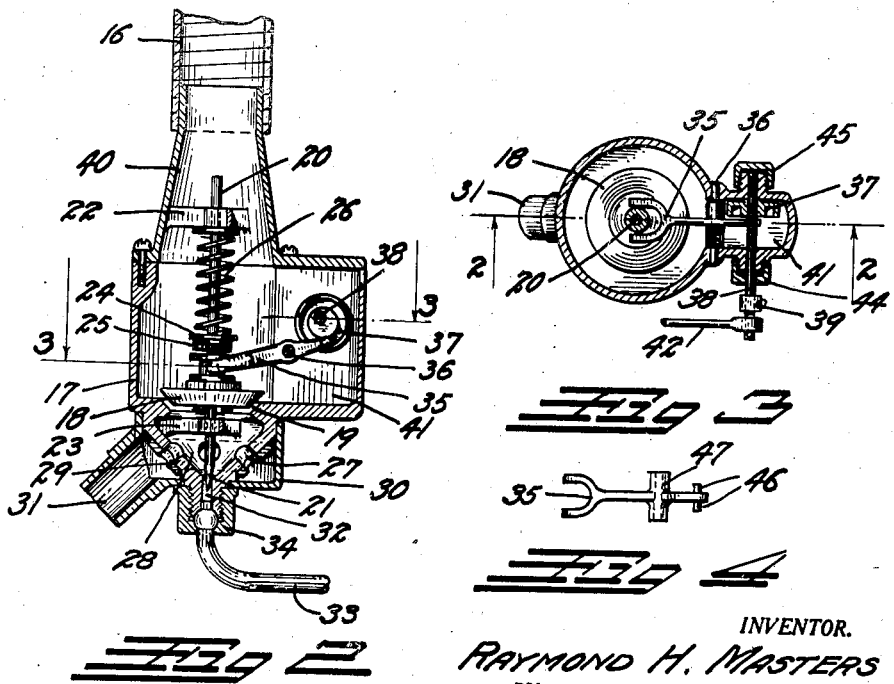
INVENTOR.
RAYMOND H. MASTERS
BY
ATTORNEY.

Patented Nov. 14, 1933

1,934,987

UNITED STATES PATENT OFFICE 1,934,987

GAS SAVER

Raymond H. Masters, Denver, Colo.

Application May 16, 1931, Serial No. 537,821
Renewed October 28, 1932

9 Claims. (Cl. 123—25)

It is well known that internal combustion engines will operate more quietly with moist air than with dry air. Many devices have been designed for feeding auxiliary moist air to an engine. Most of these devices, however, operate from the suction of the intake and in direct proportion to the speed and throttle opening of the engine. At relatively high and low speeds and with a relatively wide throttle opening they do not operate at all because of the reduced vacuum in the intake manifold. When the throttle is closed and no power is desired they operate more efficiently because of the increased vacuum in the intake. Thus with the present devices for feeding auxiliary moist air, efficient operation is only obtained at times when no power is desired from the engine.

The principal object of the present invention is to provide a highly efficient auxiliary moist air feeding device or "gas saver" in which the control of the air and moisture will be in direct proportion to the throttle opening regardless of the engine speed. It will therefore act to assist the engine during hard pulling; to increase its "pickup"; and when the throttle is closed, as when idling, it will be completely inoperative.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a diagrammatic side elevation of an automobile engine and radiator illustrating the invention in place thereon.

Fig. 2 is a vertical section through the invention, taken on the line 2—2, Fig. 3.

Fig. 3 is a horizontal section taken on the line 3—3, Fig. 2.

Fig. 4 is a detail view of the valve operating yoke employed in the device.

In Fig. 1 a typical automobile engine is indicated at 10, with its intake manifold at 11, carburetor at 12, throttle valve at 13, throttle control rod at 14, and radiator at 15. The invention is applied to the engine by connecting a tube 16 through the wall of the intake manifold 11 between the carburetor 12 and the engine 10, preferably at the point where the riser from the carburetor connects with the manifold proper, as indicated in Fig. 1.

The invention comprises a housing 17 closed by means of a conical cap 40, the top of which communicates through the tube 16. The tube 16 may be formed of flexible metal tubing, as illustrated. An air valve 18 is arranged to close a seat 19 in the bottom of the housing 17. The valve 18 is slidably mounted upon a needle valve stem 20 which terminates at its lower extremity in a needle valve 21 which closes a moist air intake passage 32. The valve stem 20 is guided and maintained concentric with the seat 19 and the passage 32 by means of an upper spider 22 and a lower spider 23. The stem is provided with an abutment flange 24 below which a cushion washer 25 is placed. A compression spring 26 acts between the flange 24 and the upper spider 22 so as to constantly urge the needle valve 21 toward its seat.

Thus, as the valve 18 is lifted it will first open the valve seat 19 and then strike the washer 25 and act against the flange 24 to open the needle valve 21. Comparatively little play is left for the valve 18 on the stem 20, so that the needle valve will open promptly after the opening of the valve 18. Sufficient play should be allowed, however, to insure the two valves 18 and 21 seating independently.

Air is admitted to the housing 17 through a series of intake ports 27 formed in a conical bottom or air chamber 28 on the housing 17. The area of the intake ports 27 can be adjusted by means of an adjusting sleeve 29 to admit the proper amount of air. If desired a cup member 30 may be clamped about the intake ports 27 so that all air can be admitted through a common nipple 31.

A vapor tube 33 communicates with the vapor passage 32. The vapor tube is clamped in place by means of a compression nut 34 which also serves to hold the cup member 30 in place. The vapor tube can be led to the top of the radiator 15 so as to draw moist air from above the water line in the radiator as indicated in Fig. 1. It could, however, be connected to any other suitable source of moist air. If desired, the air intake nipple 31 may be connected to the breather pipe of the engine crank case so as to take its air from the engine interior thereby obtaining preheated air and more or less waste gases.

The valve 18 is controlled by means of a yoke 35 which is mounted upon a hinge pin 36 within the housing 17. The yoke carries pin bosses 47 which act to maintain it in its proper position on the pin 36. The outer extremity of the yoke 35 is provided with cam follower pins 46 which engage an eccentric groove in a face cam 37 carried on a cam shaft 38. The extremity of the yoke 35 and the cam 37 are contained in a side chamber 41 formed on the housing 17. The cam shaft 38 passes to the exterior of the housing and terminates in an operating lever 39. The operating lever 39 is connected to the throttle operating rod 14 by means of a suitable connecting rod 42 and a suitable attachment fitting 43.

It will be noted from the above construction that, as the throttle rod 14 moves to open the throttle, it will also act to rotate the cam 37 and cause the yoke 35 to operate the valve 18 and open both it and the needle valve 21. This allows the vacuum in the intake manifold 11 to draw auxiliary air into the engine which has been moistened by water vapor entering through the vapor tube 33.

It is desired to call attention to the fact that the operation of the valves 18 and 21 is positive, that is, they do not depend in any way upon the velocity of the air passing through the device. They will not therefore, interfere with the idling speed of the engine and will be brought into full operation when it is desired to speed up the engine or give it more power for hard pulls regardless of its speed.

It is preferred to form two threaded bosses upon the chamber 41 where the cam shaft 38 passes through. One of these bosses carries a packing nut 44 for sealing about the shaft 38, the other carries a cap nut 45 for sealing the extremity of the shaft. With this construction the shaft 38 can be reversed to project on the opposite side of the chamber 41 by reversing the caps 44 and 45, to suit various installation requirements. The yoke 35 can be operated equally well from either side as the cam following pins 46 project from both sides of the yoke.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A gas saver for internal combustion engines comprising: a housing; a needle valve seat in the bottom of said housing; means for conveying water vapor to said needle valve seat; a needle valve stem extending upwardly from said needle valve; an air valve seat arranged above said needle valve seat; air intake openings between said two seats; an air valve adapted to close said air valve seat, said air valve being mounted on said needle valve stem; and means for manually lifting said stem so as to open both said valves.

2. A gas saver for internal combustion engines comprising: a housing; a needle valve seat in the bottom of said housing; means for conveying water vapor to said needle valve seat; a needle valve stem extending upwardly from said needle valve; an air valve seat arranged above said needle valve seat; air intake openings between said two seats; an air valve adapted to close said air valve seat, said air valve being mounted on said needle valve stem; means for manually lifting said stem so as to open both said valves; and a compression spring acting to normally force said stem downward to close said valves.

3. A gas saver for internal combustion engines comprising: a housing; a needle valve seat in the bottom of said housing; means for conveying water vapor to said needle valve seat; a needle valve stem extending upwardly from said needle valve; an air valve seat arranged above said needle valve seat; air intake openings between said two seats; an air valve adapted to close said air valve seat, said air valve being mounted on said needle valve stem; means for manually lifting said stem so as to open both said valves, said latter means comprising, a yoke; a cam adapted to act on said yoke to cause it to actuate said air valve; and means for rotating said cam.

4. A gas saver for internal combustion engines comprising: a housing; a conical bottom in said housing; a needle valve at the lowermost point of said conical bottom; an air valve in said housing above said conical bottom; means for admitting water vapor below said needle valve; means for admitting air between said needle valve and said air valve; a cap for said housing; and means for manually operating said valves.

5. In a device for admitting moist air to an internal combustion engine, a closed housing; an air chamber below said housing; a horizontal valve seat between said housing and said air chamber; a moisture passage entering the bottom of said air chamber; a needle valve closing said moisture passage; a stem on said needle valve extending upwardly through said air chamber and said air valve seat into said housing; an air valve slidably mounted on said stem so as to close said air valve seat; a fixed guide for said stem adjacent its upper extremity; an abutment on said stem intermediate its extremities; a spring compressed between said abutment and said fixed guide so as to urge said needle-valve toward its seat; and means for lifting said air valve upon said stem so as to open said needle valve.

6. In a device for admitting moist air to an internal combustion engine, a closed housing; an air chamber below said housing; a horizontal valve seat between said housing and said air chamber; a moisture passage entering the bottom of said air chamber; a needle valve closing said moisture passage; a stem on said needle valve extending upwardly through said air chamber and said air valve seat into said housing; an air valve slidably mounted on said stem so as to close said air valve seat; a fixed guide for said stem adjacent its upper extremity; an abutment on said stem intermediate its extremities; a spring compressed between said abutment and said fixed guide so as to urge said needle valve toward its seat; means for lifting said air valve upon said stem so as to open said needle valve; and means for lifting said air valve into contact with said abutment so as to open both said valves against the action of said spring.

7. In a device for admitting moist air to an internal combustion engine, a closed housing; an air chamber below said housing; a horizontal valve seat between said housing and said air chamber; a moisture passage entering the bottom of said air chamber; a needle valve closing said moisture passage; a stem on said needle valve extending upwardly through said air chamber and said air valve seat into said housing; an air valve slidably mounted on said stem so as to close said air valve seat; a fixed guide for said stem adjacent its upper extremity; an abutment on said stem intermediate its extremities; a spring compressed between said abutment and said fixed guide so as to urge said needle valve toward its seat; a yoke pivoted intermediate its extremities and engaging said air valve at its one extremity; and a rotatable cam engaging the other extremity of said yoke so as to cause the latter to lift said air valve against said abutment and thence lift both valves against the action of said spring.

8. In a device for admitting moist air to an internal combustion engine, a closed housing; an air chamber below said housing; a horizontal valve seat between said housing and said air chamber; a moisture passage entering the bottom of said air chamber; a needle valve closing said moisture passage; a stem on said needle valve extending upwardly through said air chamber and said air valve seat into said housing; an air valve slidably mounted on said stem so as to close said air valve seat; a fixed guide for said stem adjacent its upper extremity; an abutment on said stem intermediate its extremities; a spring compressed between said abutment and said fixed guide so as to urge said needle valve toward its seat; a yoke pivoted intermediate its extremities and engaging said air valve at its one extremity; and a rotatable cam engaging the other extremity of said yoke so as to cause the latter to lift said air valve against said abutment and thence lift both valves against the action of said spring, all of said above elements being enclosed in said housing.

9. In a device for furnishing moistened auxiliary air to the intake manifold of an internal combustion engine, a housing; an air chamber formed on the bottom of said housing; an air valve positioned between said air chamber and said housing; air intake ports opening from said air chamber to the atmosphere; an adjusting sleeve controlling said latter ports; and means for admitting moisture to said air chamber.

RAYMOND H. MASTERS.